US012332953B1

(12) United States Patent
Zoller et al.

(10) Patent No.: US 12,332,953 B1
(45) Date of Patent: Jun. 17, 2025

(54) CONTENT CURATION APPLICATION AND GRAPHICAL USER INTERFACE

(71) Applicant: United Services Automobile Association (USAA), San Antonio, TX (US)

(72) Inventors: Cindy Zoller, Mico, TX (US); Dennis Myers, San Antonio, TX (US); Amy Rice, Colorado Springs, CO (US); Larry Young, San Antonio, TX (US); Georgiana Watts, New Braunfels, TX (US); Michael Bergin, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/202,145

(22) Filed: May 25, 2023

Related U.S. Application Data

(63) Continuation of application No. 17/872,818, filed on Jul. 25, 2022, now Pat. No. 11,704,378, which is a continuation of application No. 17/030,042, filed on Sep. 23, 2020, now Pat. No. 11,423,105, which is a continuation of application No. 16/038,950, filed on Jul. 18, 2018, now Pat. No. 10,789,315.

(60) Provisional application No. 62/534,485, filed on Jul. 19, 2017.

(51) Int. Cl.
*G06F 16/34* (2025.01)
*G06F 16/9535* (2019.01)
*G06F 40/14* (2020.01)
*G06F 40/221* (2020.01)

(52) U.S. Cl.
CPC .......... *G06F 16/9535* (2019.01); *G06F 16/34* (2019.01); *G06F 40/14* (2020.01); *G06F 40/221* (2020.01)

(58) Field of Classification Search
USPC ........................................................ 715/234
See application file for complete search history.

(56) References Cited

U.S. PATENT DOCUMENTS

| 6,963,874 B2 * | 11/2005 | Kasriel | G06F 16/958 |
| | | | 709/224 |
| 2004/0019677 A1 * | 1/2004 | Fukumoto | G06F 16/958 |
| | | | 709/224 |
| 2004/0122974 A1 | 6/2004 | Murakami | |
| 2004/0145778 A1 | 7/2004 | Aoki et al. | |

(Continued)

*Primary Examiner* — Rinna Yi
(74) *Attorney, Agent, or Firm* — Fletcher Yoder, P.C.

(57) ABSTRACT

Systems, methods, and products described herein include a server, which receives a request from a user's electronic client device. The server may query web pages and determine if the web pages comply with the compliance rules. When the web pages do not comply with the compliance rules, the server may generate an analysis report on the web pages and send the analysis report to the user. After the user reviews the report and chooses the trouble web pages, the server sends review alerts to the points of contact, such as the product owners and other stakeholders. The product owner may more easily be able to take proper actions and better manage the websites by refreshing noncompliant or incorrect content. In this way, the systems and methods allow product owners and users to manage and/or curate the content of web pages more systematically and automatically.

19 Claims, 12 Drawing Sheets

(56) References Cited

U.S. PATENT DOCUMENTS

| | | |
|---|---|---|
| 2004/0158429 A1 | 8/2004 | Bary et al. |
| 2005/0262063 A1 | 11/2005 | Conboy et al. |
| 2007/0101061 A1 | 5/2007 | Baskaran et al. |
| 2008/0082687 A1 | 4/2008 | Cradick et al. |
| 2012/0047161 A1* | 2/2012 | Moadus ................ G06F 16/958 707/769 |
| 2014/0122245 A1* | 5/2014 | Qu ..................... G06Q 30/0269 705/14.66 |
| 2014/0282025 A1* | 9/2014 | Fan ...................... G06F 16/958 715/736 |
| 2016/0248644 A1* | 8/2016 | Dontcheva ............ G06T 11/206 |
| 2018/0052942 A1 | 2/2018 | Ikeda |

* cited by examiner

Welcome David, New Digital Publishing Request: DP_12345

D|I|3 | Content Curation Work Queues | Report at a Glance | Submit a Request | Available Customer Queues

| 1 General | 2 Date & Contacts | 3 Curation | ④ Review |

302 Curate Content

304 Tell us what type of URL you want to update [?]

☐ New URL   ☐ Existing URL   ☐ Complex Module/Glossary/Help/Disclosure Only

306 Select all groups that have participated in the review of this page or object ☐ Accessibility   ☐ Brand Strategy   ☐ Enterprise Advise Group   ☐ Compliance   ☐ Search Engine Optimization   ☐ Design Standards   ☐ None

308 Enter new URL in the text box

314 You must have a new DID number or a new DID suffix (mmyy) to enter a URL here.
URL format https://www.link.com

310 Add URLs to grid

312 Tell us what action you'd like to make on this URL [?]

☐ Curate URL   ☐ Retire URL   ☐ Do not Curate

Select Curated Metadata Information

| | All URLs | Active URLs | Expired URLs | | URLs in Curration | |
|---|---|---|---|---|---|---|
| | 100364 | 4603 | 5561 | | 491 in Curration | |

Active URL Catalog

| Storefront (Like) | Product | URL |
|---|---|---|
| --Select-- | | Tab out of text box to activate search |

| Clear Filtered Search | Export to Excel | Reset after export |
|---|---|---|

| View | URL | Status | Storefront | Product # | Review | Notify | Updated |
|---|---|---|---|---|---|---|---|
| View | https://www.CompanyA.com/ProductA | Active | ASC | ASC (FTD, FedEX, Mibshop, TurboTax, Offer-edo) | 5/5/2018 | 2/4/2018 | 5/5/2018 |
| View | https://www.CompanyA.com/ProductB | Active | ASC | Product B | 5/24/2018 | 2/23/2018 | 5/24/2017 |
| View | https://www.CompanyA.com/ProductC | Active | ASC | ASC Shopping & Discounts | 0/26/2018 | 7/28/2018 | 0/26/2017 |
| View | https://www.CompanyA.com/ProductAD | Active | ASC | Product AD | 7/1/2018 | 4/12/2018 | 8/11/2018 |
| View | https://www.CompanyA.com/ProductADH | Update | ASC | ASC (PODS, ADT, Protection1, Home Improvement, Trans Union) | | | 8/2/2017 |
| View | https://www.CompanyA.com/ProductAGDWED | Update | ASC | Product AGDWED | | | 10/3/2017 |
| View | https://www.CompanyA.com/ProductA67 | Update | ASC | ASC (Explore Cruise & Travel, Travel Insured) | | | 0/26/2017 |
| View | https://www.CompanyA.com/ProductAA | Update | ASC | Product AA | | | 3/20/2018 |
| View | https://www.CompanyA.com/ProductAhmdjue | Update | ASC | ASC Rental Car | | | 3/20/2018 |
| View | https://www.CompanyA.com/ProductABV | Active | ASC | Product ABV | 1/23/2018 | 0/31/2018 | 1/28/2018 |
| View | https://www.CompanyA.com/ProductK | Update | ASC | ASC (PODS, ADT, Protection1, Home Improvement, Trans Union) | | | 2/1/2018 |
| View | https://www.CompanyA.com/ProductAKAM | Active | ASC | Product AKAM | 2/5/2019 | 1/7/2018 | 2/5/2018 |
| View | https://www.CompanyA.com/ProductLa | Active | ASC | ASC Rental Car | 2/5/2019 | 11/7/2018 | 2/5/2018 |
| View | https://www.CompanyA.com/ProductL | Active | ASC | Product L | 2/5/2019 | 1/7/2018 | 2/5/2018 |
| View | https://www.CompanyA.com/ProductO | Active | ASC | ASC (PODS, ADT, Protection1, Home Improvement, Trans Union) | 2/6/2019 | 11/8/2018 | 2/6/2018 |
| View | https://www.CompanyA.com/ProductR | Active | ASC | Product R | 2/22/2019 | 1/24/2018 | 2/22/2018 |
| View | https://www.CompanyA.com/ProductH | Active | ASC | ASC (PODS, ADT, Protection1, Home Improvement, Trans Union) | 2/6/2019 | 11/8/2018 | 2/6/2018 |
| View | https://www.CompanyA.com/ProductATG | Active | ASC | Product ATG | 2/22/2019 | 1/24/2018 | 2/22/2018 |
| View | https://www.CompanyA.com/ProductABA | Active | ASC | ASC (Explore Cruise & Travel, Travel Insured) | 2/22/2019 | 1/24/2018 | 2/22/2018 |
| View | https://www.CompanyA.com/ProductAABS | Active | ASC | Product AABS | 2/23/2019 | 1/24/2018 | 2/22/2018 |

| All URLs | Active URLs | Expired URLs | | URLs in Curation | |
|---|---|---|---|---|---|
| 100364 | 4603 | 5561 | | 491 in Curration | |

Retired URL Catalog

| Storefront (Like) | Product | URL (Like) |
|---|---|---|
| --Select-- | | Tab out of text box to activate search |
| Clear Filtered Search | | Reset |

| View | URL | Status | Storefront | Product # | Review | Notify | Updated |
|---|---|---|---|---|---|---|---|
| View | https://www.CompanyA.com/ProductA | Retired | ASC | ASC (PODS, ADT, Protection1, Home Improvement, Trans Union) | 8/7/2018 | 8/7/2018 | 2/6/2018 |
| View | https://www.CompanyA.com/ProductB | Retired | ASC | Product B | 8/6/2018 | 4/6/2018 | 12/6/2018 |
| View | https://www.CompanyA.com/ProductAB2 | Retired | ASC | ASC Shopping & Discounts | 8/7/2018 | 4/7/2018 | 2/6/2018 |
| View | https://www.CompanyA.com/ProductBG | Retired | ASC | Product BG | 7/9/2018 | 8/6/2018 | 2/6/2018 |
| View | https://www.CompanyA.com/ProductBGT | Retired | ASC | ASC Shopping & Discounts | 8/7/2018 | 8/7/2018 | 12/6/2018 |
| View | https://www.CompanyA.com/ProductGBH | Retired | ASC | Product GBH | 7/8/2018 | 8/8/2018 | 2/6/2018 |
| View | https://www.CompanyA.com/ProductYH | Retired | ASC | ASC Shopping & Discounts | 8/7/2018 | 8/8/2018 | 2/6/2018 |
| View | https://www.CompanyA.com/Productt | Retired | ASC | Product t | 7/8/2018 | 4/7/2018 | 2/6/2018 |
| View | https://www.CompanyA.com/ProductABABA | Retired | ASC | ASC Shopping & Discounts | 8/7/2018 | 9/8/2018 | 2/22/2018 |
| View | https://www.CompanyA.com/ProductAL | Retired | ASC | Product AL | 8/7/2018 | 8/7/2018 | 2/9/2018 |
| View | https://www.CompanyA.com/ProductKAM | Retired | ASC | ASC (PODS, ADT, Protection1, Home Improvement, Trans Union) | 8/7/2018 | 8/7/2018 | 2/22/2018 |
| View | https://www.CompanyA.com/ProductLUARAAA | Retired | ASC | Product LUARAAA | 7/3/2018 | 5/6/2018 | 3/28/2018 |
| View | https://www.CompanyA.com/ProductU | Retired | ASC | ASC (FTD, FedEX, Mibshop, TurboTax, Offer-edo) | 7/9/2018 | 6/7/2018 | 3/28/2018 |
| View | https://www.CompanyA.com/ProductQ | Retired | ASC | Product Q | 7/9/2018 | 9/7/2018 | 4/2/2018 |
| View | https://www.CompanyA.com/ProductTTTTTT | Retired | ASC | ASC (PODS, ADT, Protection1, Home Improvement, Trans Union) | 3/7/2018 | 9/7/2018 | 4/2/2018 |
| View | https://www.CompanyA.com/ProductLAM | Retired | ASC | Product LAM | 7/8/2018 | 5/6/2048 | 2/22/2018 |
| View | https://www.CompanyA.com/Product1 | Retired | ASC | ASC Shopping & Discounts | 5/7/2018 | 7/7/2018 | 4/2/2018 |
| View | https://www.CompanyA.com/Product2 | Retired | ASC | Product 2 | 7/3/2018 | 8/6/2018 | 4/2/2018 |
| View | https://www.CompanyA.com/Product3 | Retired | ASC | ASC (Explore Cruise & Travel, Travel Insured) | 8/7/2018 | 5/7/2018 | 4/2/2018 |
| View | https://www.CompanyA.com/Product56 | Retired | ASC | Product 56 | 7/9/2018 | 8/6/2018 | 4/2/2018 |

718 — URL = Expiring within 30 days of today — 710 Send 30 day notice

| 30 | Approver | Email | Manager | Manager_Email |
|---|---|---|---|---|
| 1 | Elliot Smith | elliot.smith@company.com | Robert Black | rober.black@company.com |
| 2 | Joseph Andre | josephandre@company.com | John Black | john.black@company.com |
| 5 | Mike Johnson | mikejohnson@company.com | Linda Black | linda.black@company.com |
| 1 | Jack Jackson | jackjackson@company.com | James Black | james.black@company.com |
| 3 | Jack Levitt | jacklevitt@company.com | Phyllis Black | phyllis.black@company.com |

718 — 720 — 722 — 724

704 — URL = Expiring between 31 and 60 days from today — 712 Send 30 day notice

| 30 | Approver | Email | Manager | Manager_Email |
|---|---|---|---|---|
| 1 | John Lawlord | john.lawlor@company.com | Kate Cruze | kate.cruze@company.com |
| 2 | Jack Gill | jack.gill@company.com | Beth Cruze | beth.cruze@company.com |
| 5 | Jessica Gill | jessica.gill@company.com | Molly Cruze | monlly.cruze@company.com |
| 1 | Parker Smith | parker.smith@company.com | Holly Cruze | holly.cruze@company.com |
| 3 | Robert Brown | robert.brown@company.com | Laura Cruze | laura.cruze@company.com |

706 — URL = Expiring between 61 and 60 days from today — 714 Send 30 day notice

| 30 | Approver | Email | Manager | Manager_Email |
|---|---|---|---|---|
| 1 | Jon Smith | joh.smith@company.com | Pete White | pete.white@company.com |
| 2 | Linda Smith | linda.smith@company.com | Keven White | keven.white@company.com |
| 5 | Lea Smith | lea.smith@company.com | Cody White | cody.white@company.com |
| 1 | Jack Smith | jack.smith@company.com | Boston White | boston.white@company.com |
| 3 | Rose Smith | rose.smith@company.com | Olivia White | olivia.white@company.com |

78 — URL = That have Expired and are no longer Compliant — 716 Send 30 day notice

| 30 | Approver | Email | Manager | Manager_Email |
|---|---|---|---|---|
| 1 | Elliot Jones | elliot.jones@company.com | Julia Brown | julia.brown@company.com |
| 2 | Joseph Jones | joseph.jones@company.com | Sherry Brown | sherry.brown@company.com |
| 5 | Mike Jones | mike.jones@company.com | Chad Brown | chad.brown@company.com Manager Email |
| 1 | Jack Jones | jack.jones@company.com | Henry Brown | henry.borwn@company.com |
| 3 | Jake Jones | jake.jones@company.com | Charlie Brown | charli.borwn@company.com |

*FIG. 7*

David, welcome to the Content Curation Application home page.

Content Approvers

Acting Store Managers

Perform Curation Duties on Behalf of the Content Approver
When requested, you'll
- Work closely with the Content Approver and Digital Content Management (DCM) leads to assure curated meets standards
- Keep the Content Approver informed as to status of the curation effort and actions you take on their behalf.

| Name | Email | Logon |
|---|---|---|
| Robert Black | robert.black@company.com | Log on 001 |
| John Black | john.black@company.com | Log on 002 |
| Linda Black | linda.black@company.com | Log on 003 |
| James Black | james.black@company.com | Log on 004 |
| Phyllis Black | phyllis.black@company.com | Log on 005 |

Logon

Get Started

*FIG. 8A*

David, welcome to the DI3 Content Approver's home page.

| D|I|3 | Content Curation Work Queues | Report at a Glance | Submit a Request | Available Customer Queues |

Delegate a Team Member to Create Your Products — 28

| Web Page ID | Approver ID | Delegate ID | Delegate Name | Delegate Email |
|---|---|---|---|---|
| Web Page 1 | Approver 1 | Delegate 1 | Delegate Name 1 | Delegate Name 1 |
| Web Page 2 | Approver 2 | Delegate 2 | Delegate Name 2 | Delegate Name 2 |
| Web Page 3 | Approver 3 | Delegate 3 | Delegate Name 3 | Delegate Name 3 |
| Web Page 4 | Approver 4 | Delegate 4 | Delegate Name 4 | Delegate Name 4 |
| Web Page 5 | Approver 5 | Delegate 5 | Delegate Name 5 | Delegate Name 5 |
| Web Page 6 | Approver 6 | Delegate 6 | Delegate Name 6 | Delegate Name 6 |
| Web Page 7 | Approver 7 | Delegate 7 | Delegate Name 7 | Delegate Name 7 |
| Web Page 8 | Approver 8 | Delegate 8 | Delegate Name 8 | Delegate Name 8 |

[Enter Delegate's name] [Search]

Available Items to Curate

| Action ID | CCA | Batch | URL | Status | Action | Storefront | Product | Review Date | Modify Date | Update Date | DID |
|---|---|---|---|---|---|---|---|---|---|---|---|
| Action ID 1 | CCA 1 | CCA 1 | URL 1 | Status 1 | Action 1 | Storefront 1 | Product 1 | Review Date 1 | Modify Date 1 | Update Date 1 | DID 1 |
| Action ID 2 | CCA 2 | CCA 2 | URL 2 | Status 2 | Action 2 | Storefront 2 | Product 2 | Review Date 2 | Modify Date 2 | Update Date 2 | DID 2 |
| Action ID 3 | CCA 3 | CCA 3 | URL 3 | Status 3 | Action 3 | Storefront 3 | Product 3 | Review Date 3 | Modify Date 3 | Update Date 3 | DID 3 |
| Action ID 4 | CCA 4 | CCA 4 | URL 4 | Status 4 | Action 4 | Storefront 4 | Product 4 | Review Date 4 | Modify Date 4 | Update Date 4 | DID 4 |
| Action ID 5 | CCA 5 | CCA 5 | URL 5 | Status 5 | Action 5 | Storefront 5 | Product 5 | Review Date 5 | Modify Date 5 | Update Date 5 | DID 5 |
| Action ID 6 | CCA 6 | CCA 6 | URL 6 | Status 6 | Action 6 | Storefront 6 | Product 6 | Review Date 6 | Modify Date 6 | Update Date 6 | DID 6 |
| Action ID 7 | CCA 7 | CCA 7 | URL 7 | Status 7 | Action 7 | Storefront 7 | Product 7 | Review Date 7 | Modify Date 7 | Update Date 7 | DID 7 |
| Action ID 8 | CCA 8 | CCA 8 | URL 8 | Status 8 | Action 8 | Storefront 8 | Product 8 | Review Date 8 | Modify Date 8 | Update Date 8 | DID 8 |
| Action ID 9 | CCA 9 | CCA 9 | URL 9 | Status 9 | Action 9 | Storefront 9 | Product 9 | Review Date 9 | Modify Date 9 | Update Date 9 | DID 9 |
| Action ID 10 | CCA 10 | CCA 10 | URL 10 | Status 10 | Action 10 | Storefront 10 | Product 10 | Review Date 10 | Modify Date 10 | Update Date 10 | DID 10 |
| Action ID 11 | CCA 11 | CCA 11 | URL 11 | Status 11 | Action 11 | Storefront 11 | Product 11 | Review Date 11 | Modify Date 11 | Update Date 11 | DID 11 |
| Action ID 12 | CCA 12 | CCA 12 | URL 12 | Status 12 | Action 12 | Storefront 12 | Product 12 | Review Date 12 | Modify Date 12 | Update Date 12 | DID 12 |

*FIG. 8B*

CONTENT CURATION APPLICATION AND GRAPHICAL USER INTERFACE

CROSS-REFERENCE TO RELATED APPLICATIONS

This application is a continuation of U.S. Non-Provisional patent application Ser. No. 17/872,818, entitled "Content Curation Application and Graphical User Interface," filed Jul. 25, 2022, which is a continuation of U.S. Non-Provisional patent application Ser. No. 17/030,042, entitled "Content Curation Application and Graphical User Interface," filed Sep. 23, 2020, now U.S. Pat. No. 11,423,105, which is a continuation of U.S. Non-Provisional patent application Ser. No. 16/038,950, entitled "Content Curation Application and Graphical User Interface," filed Jul. 18, 2018, now U.S. Pat. No. 10,789,315, which claims priority to U.S. Provisional Patent Application Ser. No. 62/534,485, entitled "Content Curation Application," filed Jul. 19, 2017, each of which is hereby incorporated by reference in its entirety for all purposes.

TECHNICAL FIELD

This application relates generally to methods and systems for curating content by systematically identifying pages needing review and notifying the product owner of the pages.

BACKGROUND

A website is a collection of related web pages published on at least one webserver. The web pages are created by a website builder to provide information about products and services. The web server retrieves and delivers the web pages in response to requests from the website's users. In order to attract and retain customers and provide them with the latest information, the web pages are often updated. The need to update may be more urgent when there is a change of company policy or regulation, because the related web pages may become out of date and provide incorrect information to the users.

However, in existing and conventional methods, it can be difficult to determine who owns or is responsible for the pages. For instance, many web pages within a website may be maintained by a third-party vendor. This may not be readily apparent to the end-user because the third-party vendor may take appropriate steps to preserve the "look and feel" of each webpage. In other words, all web pages may look and feel the same to the end user; however, they may be created, maintained, and/or updated by different parties. As a result, it is often difficult for the website owner to determine whether the pages have been updated in a timely manner or whether there is incorrect information in the pages because the website owner may not maintain every web page and may not have access to the underlying code of each webpage.

Conventional methods of managing web pages offer manually checking the web pages and looking for broken links or undesirable/outdated web pages. This process is typically inefficient, time-consuming, and error prone due to the large number of web pages in a typical website and the large number of links contained within each web page. Furthermore, conventional methods may include human error in identification and reporting of webpage problems.

A website may have multiple webpages where each webpage may be created, modified, and rendered by a different computing system. For example, a website may have a webpage generated and maintained by a computer system associated with health care product/service and another webpage generated and maintained by another computer system associated with finance product/service. In addition, one webpage generated by a computer system may display contents (e.g., be linked with) from other webpage generated and maintained by other computer systems. Therefore, changes in one system may lead to changes to another system. The conventional methods may lack communication among various systems involved in different webpages of a website. The lack of automated real-time line of sight across systems limits the ability of conventional software solutions to determine whether content from one system is referenced in another system. As a result, many conventional methods are unable to query all systems for changes. In the absence of an automated solution, easy manual querying of systems is desired. However, there is no widely accessible, one-stop, robust and accurate querying tool for finding a requested string of content across all publishing systems. Therefore, outdated/incorrect content requiring changes can be missed without multiple teams searching, where possible, through multiple tools.

Most conventional methods also lack cross-system change notifications. When, for instance, content of a webpage changes in its source system, there may be no specific automatic trigger mechanisms to identify content in the multiple systems needing updates. In addition, most systems may lack periodic review notification and content subscription. Most systems may not have a manual date-based notification trigger for content needing regular review or the ability of notifying content publishers or "non-users" of the systems whether a particular piece of content is updated or expired.

Other publishing areas should be able to benefit from this capacity, but it is dependent on development of relevant rules from compliance and other groups. Most conventional methods may lack resources to review/curate pages. Existing resources have not had capacity to review the content. Most conventional methods may lack clarity on appropriate final approver for content. For example, project teams may see the project sponsor as final decision authority for published content tied to their project, whereas the relevant product manager or channel manager may be procedurally assigned as decision authority for that business-managed content. Most conventional methods may lack clarity on points of contact, support teams for different systems. With all the various publishing systems, there is likely plenty of documentation identifying support teams and points of contact. There is not, however, a clear, simple view into this documentation, known to and available to all interested parties across the enterprise. Most conventional methods may lack clarity on when to use appropriate systems for people who are unfamiliar with standard practices. The coordination may be cumbersome in conventional methods.

It is desired to have content curation systems and methods that solve the aforementioned problems of excess complexity and inefficiency. It is desired to have content curation systems and methods that can identify web pages needing review and the corresponding points of contact systematically and automatically.

SUMMARY

For the aforementioned reasons, there is a need for a more accurate and efficient system and method that would allow a server to curate and manage the content (e.g., web pages)

systematically to guarantee the content is correct and updated. Also, there is a need for a specially designed graphical user interface that can easily illustrate curation data. Discussed herein are systems and methods for setting compliance rules for different content, identifying the web pages in need of review and the corresponding points of contact, triggering a review alert when the content does not comply with the compliance rules, and further sending the review alert to the points of contact regarding the web pages needing review. As a result, the points of contact, such as the product owner who is responsible for the published content, can look into the content and determine whether and how to update or expire the content.

In one embodiment, a computer-implemented method comprises receiving, by a server from a computing device, a request to determine compatibility of a set of web pages within a website, the request comprising an identification associated with the set of web pages and one or more attributes to be analyzed; retrieving, by the server from a webserver associated with the website, markup language for each web page within the set of web pages based on the received identification; parsing, by the server, content of the markup language of each web page to extract content and metadata associated with each web page, the metadata corresponding to at least a time stamp associated with the respective web page, and the content of each web page corresponding to data displayed when each web page is rendered; determining, by the server based on one or more compliance rules in a database selected using the one or more attributes, whether content in the web pages satisfies a threshold value stored in the database based on the parsed and extracted content and metadata of each web page; and displaying, by the server on the computing device, a graphical user interface comprising one or more graphical representations of one or more bundles of web pages, each bundle corresponding to a group of web pages having at least one common attribute, each graphical representation of the one or more bundles comprising: a first indication corresponding to a first subset of web pages that satisfy the threshold, a second indication corresponding to a second subset of the web pages that satisfy the threshold but will no longer satisfy the threshold after a predetermined period of time, a third indication corresponding to a third subset of web pages that do not satisfy the threshold and are displayed within the website, a fourth indication corresponding to a fourth subset of web pages that do not satisfy the threshold and are no longer displayed within the website.

In another embodiment, a system comprises a webserver configured to displays a website comprising a set of webpages, each webpage being associated with a different computer system; a computing device configured to transmit a request to determine compatibility of the set of web pages within the website, the request comprising an identification associated with the set of web pages and one or more attributes to be analyzed, a server communicatively coupled with the webserver and the computing device, the server configured to receive, from the computing device, the request to determine compatibility of the set of web pages within a website, the request comprising an identification associated with the set of web pages and one or more attributes to be analyzed; retrieve, from a webserver associated with the website, markup language for each web page within the set of web pages based on the received identification; parse content of the markup language of each web page to extract content and metadata associated with each web page, the metadata corresponding to at least a time stamp associated with the respective web page, and the content of each web page corresponding to data displayed when each web page is rendered; determine, based on one or more compliance rules in a database selected using the one or more attributes, whether content in the web pages satisfies a threshold value stored in the database based on the parsed and extracted content and metadata of each web page; and display, on the computing device, a graphical user interface comprising one or more graphical representations of one or more bundles of web pages, each bundle corresponding to a group of web pages having at least one common attribute, each graphical representation of the one or more bundles comprising: a first indication corresponding to a first subset of web pages that satisfy the threshold, a second indication corresponding to a second subset of the web pages that satisfy the threshold but will no longer satisfy the threshold after a predetermined period of time, a third indication corresponding to a third subset of web pages that do not satisfy the threshold and are displayed within the website, a fourth indication corresponding to a fourth subset of web pages that do not satisfy the threshold and are no longer displayed within the website.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

FIG. 3 illustrates an example of a graphical user interface of an intake form for curating contents, according to an embodiment.

FIG. 5 illustrates an example of a graphical user interface for displaying active URL catalog, according to an embodiment.

FIG. 6 illustrates an example of a graphical user interface for displaying retired URL catalog, according to an embodiment.

FIG. 7 illustrates an example of a graphical user interface for displaying messaging reports, according to an embodiment.

FIG. 8A illustrates an example of a graphical user interface for displaying delegated users, according to an embodiment.

FIG. 8B illustrates an example of a graphical user interface for a product owner/content approver to curate web pages, according to an embodiment.

DETAILED DESCRIPTION

Figure 1:
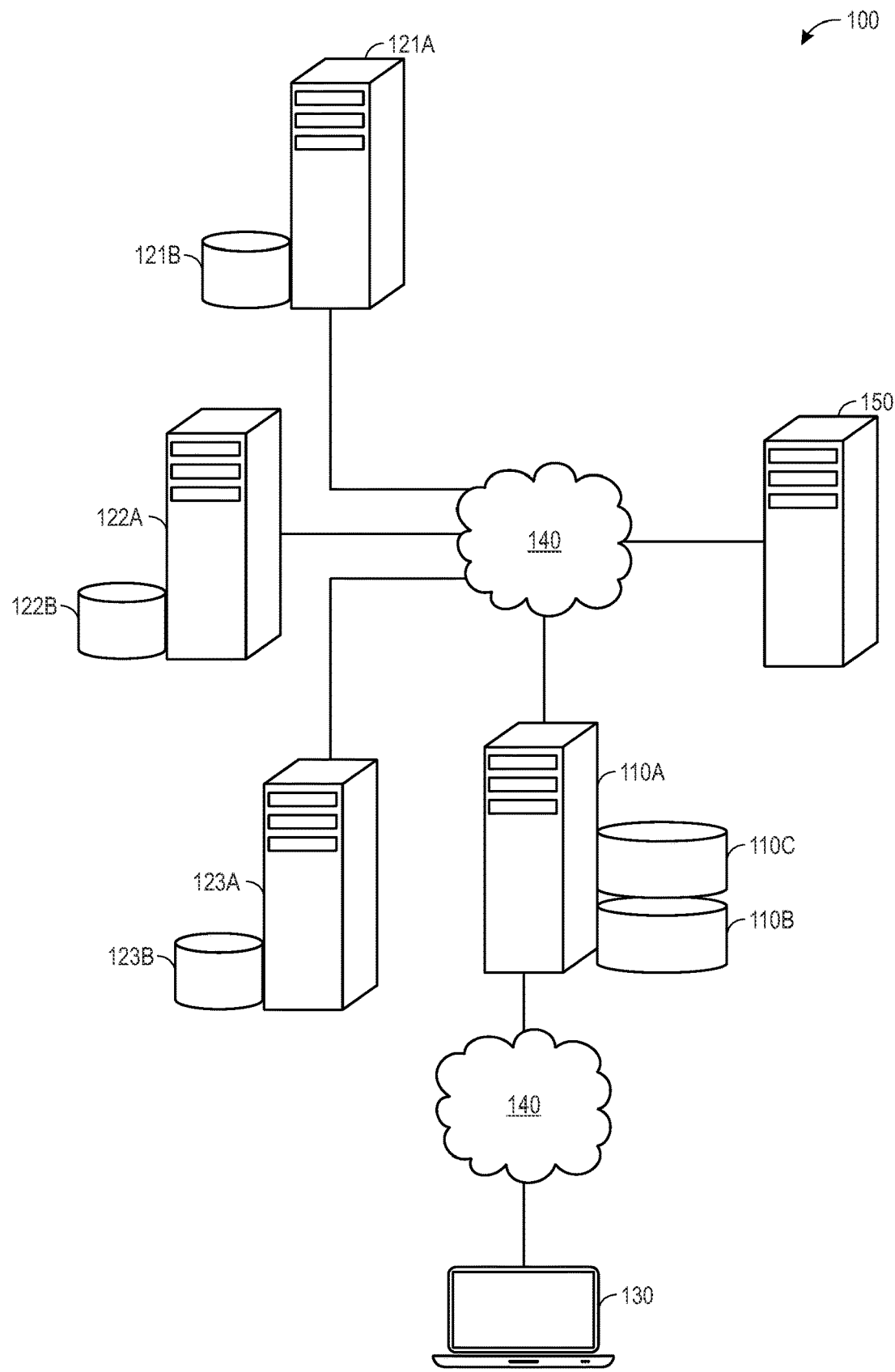
FIG. 1 illustrates a computer system for curating content, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described m the detailed description are not meant to be limiting of the subject matter presented here.

FIG. 1 illustrates components of a system 100 for content curating, according to an embodiment. The system 100 may comprise an analytic server 110a, a compliance rule database 110b, a web page database 110c, an electronic administrative user device 130 operated by an administrative user, a web server 150, and a set of website builders 121a, 122a, 123a, with each of them having its own database 121b, 122b, 123b, respectively. The electronic administrative user device 130 may be connected with the analytic server 110a via hardware and software components of one or more networks 140. Further, the analytic server 110a may be connected with the web server 150 and the set of the website builders 121a, 122a, 123a via the network 140. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The electronic administrative user device 130 may be any computing device allowing a participant/user to interact with analytic server 110a. One having ordinary skill in the art would also appreciate that the electronic administrative user device 130 may be any computing device comprising a processor and non-transitory machine-readable storage medium allowing the electronic administrative user device 130 to perform the various tasks and processes described herein. The examples of the electronic administrative user device may include, but are not limited to, a desktop, a laptop, a personal digital assistant (PDA), a smartphone, a tablet computer, and the like.

The electronic administrative user device 130 may execute an Internet browser or local application that accesses the analytic server 110a in order to issue requests or instructions. The electronic administrative user device 130 may transmit credentials from user inputs to the analytic server 110a, from which the analytic server 110a may authenticate the user and/or determine a user role. One having ordinary skill in the art would appreciate that the electronic administrative user device 130 may comprise a number of input devices configured to receive any number of data inputs, including various types of data inputs allowing for authentication (e.g., username, password, certificates, and biometrics).

The electronic administrative user device 130 may be configured to communicate with the analytic server 110a through one or more networks 140, using wired and/or wireless communication capabilities. In operation, the electronic administrative user device 130 may execute a content curation program, which may include a user interface that renders an interactive layout, schematic, or other elements for the administrative user to input a request. For example, the user interface may include a text-based interface allowing the user to enter manual commands. An administrative user of a website may issue a request to check the web pages of a certain category. The analytic server 110a may check the web pages and return a set of web pages that need review. For example, the analytic server 110a may return web pages that are no longer compliant, the web pages containing errors or undesirable content, the web pages with broken links and the like.

An analytic server 110a may be any computing device comprising a processor and other computing hardware and software components, configured to process the requests received from the electronic administrative user device 130. The analytic server 110a may be logically and physically organized within the same and different devices and structures, and may be distributed across any number of physical structures and locations (e.g., cabinets, rooms, buildings, cities). The analytic server 110a may comprise, or may be in networked-communication with, a rule database 110b and a web page database 110c.

The analytic server 110a may include a rule database 110b and a web page database 110c. In operation, the rule database 110b and the web page database may be one database containing both rule data and web page data or two separate databases. A rule database 110b may be any non-transitory machine-readable media configured to store data, including compliance rule data such as internal standards, guidelines, expiration date, compliance review date, marketing compliance rules, accessibility, brand rules, product and/or service policy, regulatory rules, legal rules from the organization or company, external standards from federal reserve board or other regulatory bodies, and advice and standards from other organizations. The rules and standards may change. Thus, web pages may become out of date and not in compliance with the rules. Furthermore, the web page database 110c may be any non-transitory machine-readable media configured to store web page information data, including; web page ID, web page time stamp, subject matter of the web pages, update history of the web pages, points of contacts of the; web pages, such as the product owner, stakeholder, priority level of the; web pages, and the like. Furthermore, the databases may include other related data.

Upon the analytic server 110a receiving a request, the analytic server 110a may execute one or more component software modules to decide if a web page is in compliance with the predetermined rules and/or needs review. Specifically, the analytic server 10a may obtain the web page information such as the web page identifier data (ID), the subject matter of the web page, the detailed service and/or product information in the; web page. The analytic server 110a may further query the compliance rule from the rule database 110b for the web page and determine if the web page is in compliance or adherence to standards and rules. If the web page does not comply with the compliance rules, the analytic server may query the points of contact from the web page database 110c, and send a review alert regarding the web page to the points of contact.

The set of website builders 121a, 122a, 123a may be any computing device comprising a processor and other computing hardware and software components. Each website builder 121a, 122a, 123a may create a subset of the web pages. For example, one website builder may create the web pages for one product/service or similar products/services related to one subject matter. An organization or company may provide different products/services, thus, there may be multiple website builders 121a, 122a, 123a responsible for different parts of the website. For example, website builders 121a, 122a, and 123a may generate markup language (e.g. HTML code) that instructs the webserver 150 to render one or more webpages. Each website builder 121a, 122a, 123a may comprise, or may be in network-communication with, a database 121b, 122h, 123h. Each database stores product/service information of the web pages the website builder created. In some embodiment, a website builder may be the product owner or product manager or content approver who develops/manages the product and/or service introduced in the web page and provides the content of the web page, and act as the points of contact for the web pages. In some other embodiments, the website builders may be a third-party entity that builds web pages based on the instructions from the product owner The web server 150, also called an HTTP server, may be any computing device comprising a process or and other computing hardware and software components, configured to host content, such as a website. A website is a collection of related web pages, including multimedia content, typically identified with a common domain name, and published on at least one web server. The contents may refer to the web pages of a website and/or content in other web servers. A user may access the website by referencing a uniform resource locator (URL) that identifies the site. A website may be accessible via a public Internet Protocol (IP) network, such as the Internet, or a private local area network (LAN). The web server 150 may also comprise software that runs on the computing device that retrieves and delivers the web pages in response to requests from the website's users. Web pages, which are the building blocks of websites, are documents, typically composed in plain text interspersed with formatting instructions of Hyper Text Markup Language (HTML, XHTML). Web pages from one website may incorporate elements from other websites with suitable markup anchors. The web server 150 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled devices of various sizes, including desktop computers, laptops, PDAs and cell phones.

In some embodiments, the website administrative user may issue a request to check the web pages of a certain category from the electronic administrative user device 130. The analytic server 110a may receive the request and query the corresponding web pages from the web server 150. The analytic server 110a may query the web pages based on the web page ID and/or the subject matter of the web pages in the web page database 110c. The analytic server 110a may determine whether the web pages comply with the compliance rules in the rule database 110b. When the analytic server 110a determines a set of web pages does not comply with the compliance rules, the analytic server 110a may send a review alert to the corresponding product owners of the web pages. The analytic server 110a may obtain the corresponding product owners of the web pages by querying the points of contact in the web page database 110c. The product owner of a web page is responsible for managing the web page. The product owner may know the most about the product and/or service introduced in the web page, and may determine the content for publication in the web page.

Figure 2:
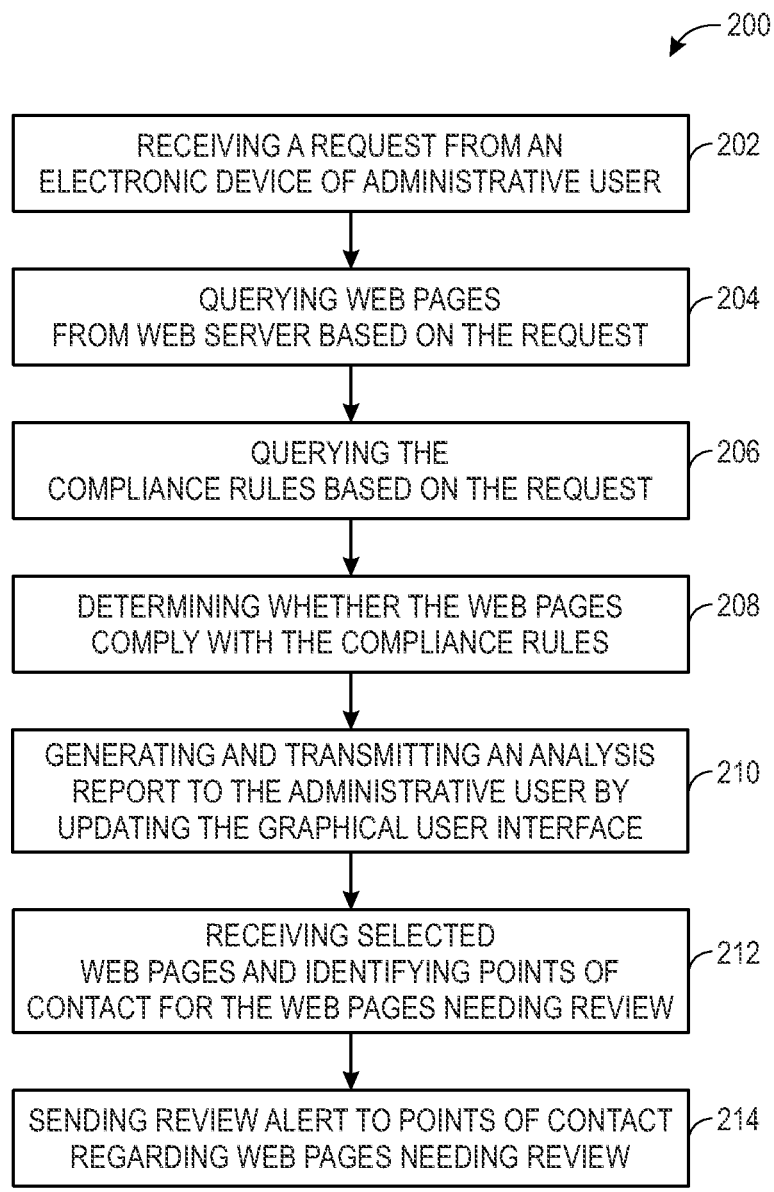
FIG. 2 illustrates a flowchart depicting operational steps for curating content, according to an embodiment.

FIG. 2 illustrates execution of a method 200 for curating content, according to an embodiment. Other embodiments may comprise additional or alternative steps, or may omit some steps altogether at step 202, the analytic server may receive a request through the graphical user interface displayed on the electronic device of the administrative user. The administrative user may be responsible to maintain a website and make sure the content of the website is correct and updated. Instead of manually checking the website to identify non-compliant web pages needing review (e.g., conventional methods), embodiments disclosed herein may allow the administrative user to issue a content curation request through an electronic device of the administrative user, and the embodiments disclosed herein may display an easy-to-digest graphical user interface to illustrate curation data regarding the website.

In one embodiment, the electronic device may execute a content curation program to allow the administrative user to input a request and display the requested information to the administrative user. The administrative user may open a website in an Internet browser or a local application on a mobile device configured to receive a request from the administrative user. The administrative user may first enter credential information such as username, password, certificate and biometrics. The electronic device then transmits the user inputs to the analytic server for authentication. The analytic server may access a system database configured to store user credentials, which the analytic sever may be configured to reference in order to determine; whether a set of entered credentials (purportedly authenticating the user) match an appropriate set of credentials that identify and authenticate the user.

After the analytic server authenticates the administrative user, the analytic server may generate a graphical user interface on the electronic device. The graphical user interface may include a field for the administrative user to input requests to check compatibility of one or more web pages in a website. The administrative user may interact with the analytic server, through a number of input interfaces of the electronic device, such as by inputting a selection as with a mouse or inputting a request as with a keyboard. The request inputted by the administrative user may include an identification associated with one or more web pages and one or more attributes to be analyzed. For example, the attribute may be expiration status. For instance, the request may be to determine compatibility of web pages from www.123.com that are out of compliance for periodic review or are at risk of being out of compliance in 3 months or less. As another example, the attribute may be a subject matter. For instance, the request may be to determine compatibility of web pages from www.123.com that are related with a certain product and/or service. The identification associated with one or more web pages may be a website address. A website address, also known as a URL (uniform resource locator), is an Internet or intranet name that points to a location where a file, directory or website page Is hosted. The administrative user may request multiple attributes to be analyzed.

The administrative user of a website may issue a content curation request m different scenarios. For example, the administrative user may issue a content curation request when there is a change of policy for the product or service. In addition, the administrative user may request to check all the pages related to the product and service to see if the web pages display the latest relevant data. Alternatively, the administrative user may issue a content curation request regularly, such as once a month to identify web pages that need review.

In some embodiments, the analytic server may comprise an automated evaluation tool that automatically tracks the web page status for content curation without the request from the administrative user.

At step 204, the analytic server may query web pages from the web server based on the identification within the request from the administrative user device. In one embodiment, the analytic server may query related web pages based on the keywords. For example, the analytic server may determine one or more keywords such as the product, service, subject matter, or the policy as the keywords to query the web server to return related web pages.

In another embodiment, the analytic server may query the web pages based on the web page ID or URL address. For example, the analytic server may be able to determine the web pages ID or URL corresponding to the identification within the request. In this case, the analytic server ma y directly query the web pages with the web page ID or URL. In another embodiment, the analytic server may query the web pages based on the update history. For example, the analytic server may query the web pages that have been updated more than a month ago based on the web page time stamp.

In another embodiment, the analytic server may query web pages by integrating with other tools, such as search engine optimization tool, spelling and grammar checking tool, site analyst tool and the like. For example, if the site analyst tool reports that a web page has zero views (e.g., viewings by different users) for six months or less than 100 views for twelve months, chances are the web page is not referenced from anything, or the link to the web page is broken and not reachable, or the information contained in the web page is not applicable. The analytic server may query such web pages for review so that the administrative user or other points of contact can determine if the web page needs to be expired.

In another embodiment, the analytic server may automatically track the website and query the web pages that have an expiration date. For example, if a web page containing service policy expires in 12 months from the moment of publishing, the analytic server may monitor the web page, query the web page after a predetermined time period (e.g., nine months), and automatically trigger a review alert for further review so that the product owner or other points of contact may be able to get alerted and work to publish new policy.

In some configurations, the analytic server may retrieve a set of web pages from the web server based on the combination of the aforementioned factors or other factors. In one embodiment, the web server may retrieve and return the queried web pages to the analytic server for further analysis. In another embodiment, the analytic server may user a web crawling or spidering software to retrieve web data. For example, the analytic server may gather and copy web page data into a central local database or spreadsheet, for later analysis.

At step 206, the analytic server may query the compliance miles from the compliance rule database based on the request. As discussed above, the compliance rule database may include different rules from internal and external organizations. The compliance rule database may further include other standards from different integrated analysis tools. In addition, the analytic server may update the compliance rule database whenever there is a change for the rules or standards. The administrative user and other contacts may set the rules and standards based on specific product or service policies.

The analytic server may query a certain set of compliance rules based on the request from the administrative user. For example, if the administrative user requests for web pages that are out of compliance for periodic review or are at risk of being out of compliance in 3 months or less (e.g., the webpage expired in 3 months), the analytic server may query the compliance rules related with the attribute of compliance review date. The administrative user may request multiple attributes to be analyzed, thus the analytic server may query compliance rules in different attributes.

In some configurations, the analytic server may use the attributes received within the request (step 202) and move directly to step 208 instead of querying a database and retrieving compliance rules. For instance, in a non-limiting example, the request may instruct the analytic server to determine whether a set of web pages have been updated within a predetermined threshold (e.g., determine whether a set of web pages have been updated, revised, or otherwise reviewed within the last 12 months). In that embodiment, the analytic server has already received the attributes and the rules to determine whether the set of web pages are in compliance. Therefore, the analytic server may move directly to step 208.

At step 208, the analytic server may determine whether the returned web pages from the web server comply with the compliance rules in the compliance rule database. To determine whether the web pages comply with the compliance rules, the analytic server may need to gather the web page content and parse and extract the detailed information from the web page. For example, the analytic server may query HTML code of web page and parse the HTML code to extract the text content of the web page. For example, the analytic server may utilize native methods to convert the HTML string to a set of DOM nodes, which can then be inserted into other document for further review. The Document Object Model (DOM) is a cross-platform and language-independent application programming interface that treats an HTML, XHTML, or XML document as a tree structure where each node is an object representing a part of the document. The objects can be manipulated programmatically and any visible changes occurring as a result may then be reflected in the display of the document. In addition, the analytic server may extract metadata associated with the web pages based on the request attributes. For example, the analytic server may extract the time stamps of the web pages.

The analytic server may determine which compliance rule applies to the specific content based on the received attributes in the administrative user's request. Different rules may apply to the same web page. The compliance rules may comprise threshold values associated with the attributes in the request For example, the compliance rule associated with the expiration status may be a date (e.g., the web page is valid until Jan. 1, 2018) or a period (e.g., the web page is valid for one year from the moment of publishing). To determine the compliance status of web pages, the analytic server may check the metadata of the web pages, such as the time stamps, and compare with the threshold values, such as the compliance review date.

The compliance rules may also include other rules that are associated with view hi story, content (e.g., specific words), links, and the like. For example, one rule may define that if a web page has views less than a threshold for a certain period (e.g., zero views for six months), the web page should be retired. Another rule may define that if a web page includes certain languages, the web page needs to be reviewed. Additionally or alternatively, one rule may check if a web page includes certain words (e.g., words that violate federal law). For instance, a webpage that uses the word "guarantee" may not be suitable for a company or a website curator. In some embodiments, if a webpage contains a predetermined word, the compliance rule may require the webpage to also contain a disclaimer (e.g., predetermined text string). Another rule may check if a web page includes links that are broken or dead links (e.g., not directing to a desired webpage) and links that are incorrect (e.g., directing to wrong destination).

The analytic serve may check each rule and generate an analysis report for each web page. The report may include the web page ID and compliance status of each rule. For example, one web page may include expiring information on product prices and return policy.

In some embodiments, the analytic server may assign a value to the web page corresponding to each compliance rule to which the web page content does not comply. The value may indicate how serious the web page violates the compliance rule. For example, a web page out of compliance for one day may have a smaller value for the expiration rule than a web page out of compliance for one year. Furthermore, the analytic server may determine whether the assigned value satisfies a threshold. The threshold may be a predetermined value stored in the compliance rule database or a value set by the administrative user. The analytic server may determine the web pages whose assigned values satisfy the threshold need immediate review.

At step 210, the analytic server may generate and transmit the analysis report to the administrative user by updating the graphical user interface. Specifically, for the web pages whose assigned values satisfy the threshold, the analytic server may generate a graphical user interface (GU I) that displays one or more; web pages and the corresponding compliance rules with which the web pages do not comply. The GUI may also include graphical element displaying a status for each web page that shows whether the web page is reviewed and updated by the points of contact. In addition, there may be a high volume of web pages containing incorrect information. The analytic server may categorize the web pages in bundles based on the attributes received from the user, or the compliance rules, or the assigned values or other categories. Specifically, the GUI may include multiple categories with each category corresponding to a bundle of web pages. For example, the analytic server may bundle the web pages based on the product/service category or keywords (e.g., web pages about banking web pages about marketing, web pages about health, and the like). In another example, the analytic server may bundle the web pages based on the compliance status. Specifically, the analytic server may bundle the web pages into a first group that are expiring in 30 days, a second group that me expiring in 60 days, a third group that are expiring in 90 days, and a fourth group that are expired.

The administrative user may reveal the webpages and determine whether the report includes false positive identifications where the web pages are in compliance even though the analytic server determines the web pages do not comply with the compliance rule. For example, one rule may define that if a web page has views less than a threshold for a certain period, the web page should be retired. Based on such a rule, the analytic server may identify a web page about life insurance that has less than 100 views in the past 12 months and determine that such a web page should be taken off. However, the web page may have to be active in the website and cannot be taken off. Thus, the administrative user may further choose through the graphical user interface which web pages are indeed non-compliant web pages that need update. The administrative user may send a second request to the analytic server requesting the analytic server to send review alerts on the chosen web pages that need update. Therefore, by involving human interference from the administrative user, the content curation system may guarantee that only non-compliant web pages containing wrong information get further review and processing while removing the false alarm on good web pages.

During the website curation process, the administrative user may need help from the product owner or product manager and other content team members to determine which web pages need to be updated. For example, the administrative user may consult with the product owner and other content team members on a specific product and/or service, or the administrative user may let the product owner and content team members make the decision.

In some embodiments, the analytic server may send all of the analysis reports regaining compliance status for each web page to the administrative user. So that the administrative user may be able to choose the non-compliant web pages. Alternatively, in some other embodiments, the analytic server may determine by itself, which analysis reports need human interference and which do not, and only send the analysis reports in need of further human interference to the administrative user. For the non-compliant web pages whose analysis reports do not need human interference, the analytic server may directly send review alerts regarding these web pages.

At step 212, the analytic server may receive the selection of web pages from the administrative user and identify the points of contact for the non-compliant web pages. The points of contact may provide information on ownership and accountability of each web page. Each web page may have its own points of contact storing in the web page database. The points of contact may be website builder who creates the web page, or the product owner or product manager who develops/manages the product and/or service introduced in the web page and provides the content of the web page, or other stakeholders. The points of contact may have different accountability for the web page. The analytic server may query the points of contact for each non-compliant web page from the web page database. The analytic server may include the points of contact for each web page in the web page database from the moment the web page is created and published. The points of contact may change. The analytic server may update the web page database to reflect the changes.

At step 214, the analytic server may transmit review alerts (e.g., electronic notifications) to the points of contact for the non-compliant web pages. The analytic server may generate a review alert for each non-compliant web page. The review alert may include similar information in the analysis report, such as the web page ID, compliance status of each rule and the assigned value. The analytic server may generate a graphical user interface (GUI) to display the review alert on the devices of the points of contact. The analytic server may display the review alert in different formats based on the devices of the points of contact. For example, the review alert displayed on a laptop may be in a different format than on a mobile phone. Furthermore, the review alert may be in different communication methods. For example, the review alert may be included in an email, a text, a SMS (short message service), an audio, and the like. The analytic server may send the review alert in one or more communication methods based on the devices of the points of contact and the user preferences.

In addition, the review alerts may include a priority level. In some embodiments, the analytic server may determine the priority of the review alerts based on the related compliance rules and the assigned values. For example, the analytic server may determine that web pages including information that violates federal law are the most urgent and have the highest priority level; the web pages with expiring information on product prices and return policy have a higher priority level than the web pages having zero views for three months. The analytic server may determine the web pages with higher assigned values have higher priori ty levels. In some other embodiments, the analytic server may determine the priority of the review alerts based on subject matter of the web page content. For example, the web pages introducing the product and/or service may have a higher priority level than the web pages introducing the company history. In some other embodiments, the administrative user or the product owner ma y set the priori ty level for a certain web pages based on the web page content. One having ordinary skill in the art would appreciate that the analytic server may determine the priority of the review alerts based on other related information.

Once the different points of contact receive the review alerts, they may collaborate with each other to maintain the web page. For example, the product owner may determine how to update the web page content, and provide the new content to the website builder. In the meantime, the product owner may need help from the stakeholders, and assign accessibility for stakeholders to come in and help. The website builder may replace the wrong or expiring content with the new content provided by the product owner. In the meantime, the website builder may update the local database to include the new content. In addition, the points of contact may consider the priority level of different review alerts, and process the alerts with higher priority level first.

In some configurations, the analytic server may also determine one or more other point of contact (e.g., website builders) associated with the non-compliant webpage. For example, if a webpage is determined to be non-compliant, the analytic server may transmit a notification to a point of contact of that webpage. The analytic server may also determine one or more related webpages and transmit notifications to one or more points of contacts for the related webpages. In this way, cross-system notifications may be easily transmitted and points of contacts may be alerted when a related webpage is non-compliant.

Furthermore, the product owner may distribute the review work internally. For example, the product manager may think the review work is too much and decide to assign the work to some assistants. The product manager may assign accessibility to the assistants.

Instead of checking each web page manually, since it is error prone and time consuming, the embodiments disclosed herein may manage and curate the contents of web pages systematically and automatically. The embodiments disclosed herein may guarantee to identify all the web pages needing review in a timely manner. Therefore, the product owner may be able to take proper actions and better manage the websites by refreshing or retiring the content.

FIG. 3 illustrates an example of a graphical user interface 300 of an intake form for curating contents, according to an embodiment. The GUI 300 may include multiple input/ selection based and text based graphical interactive elements under the menu of curate content 302. For example, the GUI may include selection based interactive elements for "what type of URL you want to update" 304, where the administrative user may be able to select from different options (e.g., input elements), such as "New URL," "Existing URL," "Complex Module/Glossary/Help/Disclosure Only." Based on the administrative user's selection, the analytic server may limit the scope of web pages curated. The GUI may also include selection based interactive elements for "Select all groups that have participated in the review of this page or object" 306, where the administrative user may select from different options, such as "Accessibility," "Brand Strategy," "Enterprise Advice Group," "Compliance," "Search Engine Optimization," "Design Standards," "None." Based on the administrative user's selection, the analytic server may determine what rules/policies to check for curating contents of the selected web pages. In this example, the analytic server may check the "Compliance" for curating contents. The GUI may also include a text-based interactive element for "Enter new URL in the text box" 308, where the administrative user may enter web addresses/URLs for the web pages the administrative user wants to check and curate (e.g., text field input element 314). The administrative user may be able to input multiple URLs by inserting each URL on a separate line, and clicking the "Add URLs to grid" button 310. Furthermore, the GUI may include selection based interactive elements for "what action you'd like to take on this URL" 312, where the administrative user may be able to select from different options, such as "Curate URL," "Retire URL," and "Do not Curate." The analytic server may take the corresponding action based on the administrative user's selection.

Figure 4:
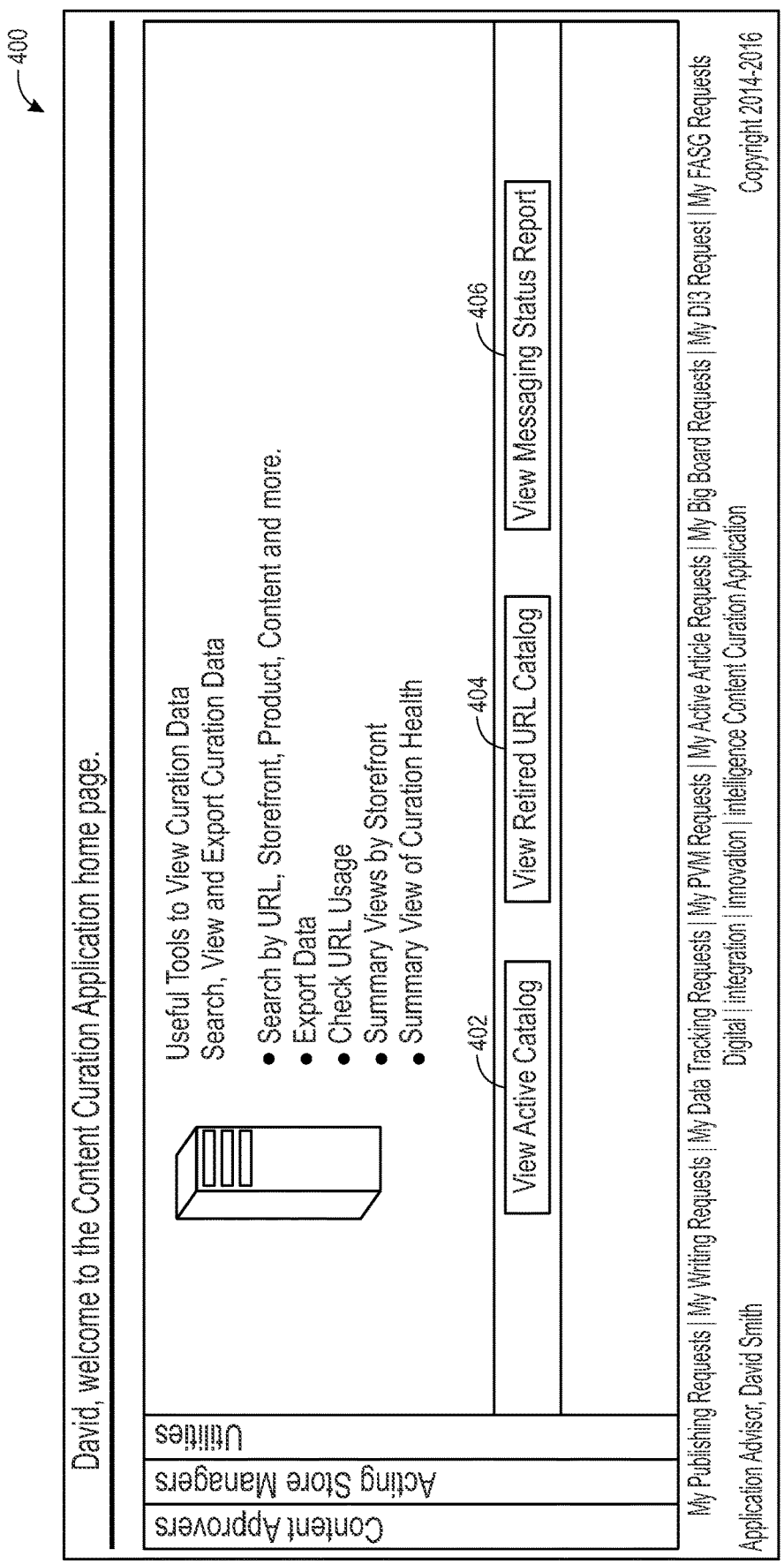
FIG. 4 illustrates an example of a graphical user interface for viewing curation data, according to an embodiment.

FIG. 4 illustrates an example of a graphical user interface 400 for viewing curation data, according to an embodiment. The GUI 400 may include useful tools to view curation data by providing the button of view active catalog 402, the button of view retired URL catalog 404, and the button of view messaging status report 406. Using the above-mentioned buttons, the administrator may customize the curation data (e.g., curation report). This is particularly important because curation data may comprise a large number of webpages or corresponding data. Therefore, customization of graphical user interfaces reporting such large volume of data is important. Upon the administrative user interacting with (e.g., clicking on) one of the buttons, the analytic server may display another GUI with detailed information corresponding to the catalog of the administrative user's selection. FIGS. 5-7 illustrate the detailed information of each catalog (e.g., active, retired, messaging status).

FIG. 5 illustrates an example of a graphical user interface 500 for displaying active URL catalog, according to an embodiment. The GUI 500 may display a form with relative information for active URLs under the menu of active URL catalog 530. For example, the form may have columns of view 502, URL 504, status 506, storefront 508, product 510, review date 512, notify date 514, and updated date 516 to provide detailed information of the active URLs. For each web page, the column of view 502 may include hyperlinks for related information of the web page. For example, when the administrative user clicks on the hyperlink "view." the analytic server may direct the administrative user to another GUI displaying the history of updates and changes of the web page, the curated rules, and any other related information. The column of URL 504 may include the web address of each web page. The column of status 506 may include status of "Active" and "Updated." This status may indicate whether the content owner has updated the corresponding URL and may be dynamically updated as the content owner updates or retired the corresponding webpage. The column of storefront 508 may provide information of company/ group/organization that owns the web page. In this example, the storefront may be ASC. The column of product 510 may provide the product/service information included in the web page. For example, some web pages may be about ASC rental car; some web pages may be about ASC shopping & discounts. The column of review date 512 may provide the date of the analytic server reviewing the web page. The column of notify date 514 may provide the date of the analytic server notifying the points of contact that the web page needs update. The column of updated date 516 may provide the date of the web page being updated by the points of contact.

Since the number of URLs may be large, the analytic server may provide filtering tools, such as a dropdown menu for the administrative user to select storefront 518, a dropdown menu for the administrative user to select product 520, and a text based interface for the administrative user to input URLs 522. In addition, the analytic server may provide other tools, such as the buttons to clear filtered search 524, export to excel 526, and reset after export 528. The GUI may also include statistic information of URLs 532, such as the number of all URLs, the number of active URLs, the number of expired URLs, and the number of URLs in curation.

FIG. 6 illustrates an example of a graphical user interface 600 for displaying retired URL catalog, according to an embodiment. The GUI 600 may display a form with relative information for retired URLs under the menu of retired URL catalog 628. For example, the form may have columns of view 602, URL 604, status 606, storefront 608, product 610, review date 612, notify date 614, and updated date 616 to provide detailed information of the retired URLs. For each web page, the column of view 602 may include hyperlinks for related information of the web page. For example, when the administrative user clicks on the hyperlink "view," the analytic server may direct the administrative user to another GUI displaying the history of updates and changes of the web page, the curated rules, and any other related information. The column of URL 604 may include the web address of each web page. The column of status 606 may include status of "Retired." The column of storefront 608 may provide information of company/group/organization that owns the web page. In this example, the storefront may be ASC and Auto Experience. The column of product 610 may provide the product/service information included in the web page. For example, some web pages may be about ASC shopping & discounts; some web pages may be car-buying service. The column of review date 612 may provide the date of the analytic server reviewing the web page. The column of notify date 614 may provide the date of the analytic server notifying the points of contact that the web page needs update. The column of updated date 616 may provide the date of the web page being updated by the points of contact.

Since the number of URLs may be large, the analytic server may provide filtering tools, such as a dropdown menu for the administrative user to select storefront 618, a dropdown menu for the administrative user to select product 620, and a text based interface for the administrative user to input URLs 622. In addition, the analytic server may provide other tools, such as the buttons to clear filtered search 624 and reset 626. The GUI may also include statistic information of URLs 630, such as the number of all URLs, the number of active URLs, the number of expired URLs, and the number of URLs in curation.

FIG. 7 illustrates an example of a graphical user interface 700 for displaying messaging reports, according to an embodiment. The GUI 700 may include real time messaging reports on URLs expiring within different periods. For example, the GUI may include reports on URLs expiring within 30 days 702, URLs expiring between 31-60 days 704, URLs expiring between 61 and 90 days 706, and URLs that have expired and are no longer compliant 708. For each of the different periods, the GUI may include a button for sending notices, such as send 30 day notice 710, send 60 day notice 712, send 90 day notice 714, and send expiration notice 716. For each expiring URL, the report may include content approver 718, the approver's email address 720, digital product manager (DPM) 722, and the manager's email address 724. The content approver and the manager may be the points of contact of the expiring web page and may be responsible for the content included in the web page/URL. Once the administrative user clicks on one of the buttons for sending notice 710, 712, 714, 716, the analytic server may send electronic messages (e.g., emails) to the content approvers and the digital product managers based on their email addresses to notify them the corresponding URLs are expiring within a certain period. For example, if the administrative user clicks on the send 30 day notice 710, the analytic server may send emails to the content approvers 71S and managers 722. Each email may include one or more URLs expiring within 30 days and be addressed to the content approver and manager associated with the URLs. In some embodiments, the analytic server may generate and update the messaging reports on a daily basis.

FIG. 8A illustrates an example of a graphical user interface 800 for displaying delegated users, according to an embodiment. The delegated users (e.g., an administrator or a person selected by the administrator) may perform curation duties on behalf of the content approver by working closely with the content approver and digital content management (DCM) to assure curated content meets standards. The delegated users may keep the content approver informed as to status of the actions taken on their behalf. The GUI may include the approvers user name 802, email address 804, and logon identifier (ID) 806. For instance, GUI 800 illustrates a subset of approvers and their corresponding information. A product owner may interact with GUI 800 to send the illustrated subset of approvers to a delegated user and request the delegated user to curate (e.g., approve, update, retire, and the like) each webpage the approvers selected. When the product owner interacts with the hyperlink button 808, the analytic server may then display the GUI 850, as described below with respect to FIG. 8B.

FIG. 8B illustrates an example of a graphical user interface 850 for a product owner/content approver to curate web pages, according to an embodiment. The GUI 850 illustrates a non-limiting example of a graphical user interface displayed on the product owner's computer. GUI 850 illustrates how the product owner receives notification regarding web page compliance (e.g., indicating the need to take appropriate an action, such as update the page, review dead links, and the like). In some configurations, GUI 850 may be an interactive interface that is continually updated by the analytic server and may represent a product owner's work queue. Utilizing the GUI 850, a product owner may receive prioritized work queue indicating which web pages need to be updated. Upon reviewing, revising, or otherwise satisfying the request (e.g., correcting the error that have caused the non-compliance), the analytic server may update the product owner's work queue displayed in GUI 850, transmit updated data directly to the publishers or other parties described herein. The GUI 850 allows product owners to curate several items at one time and have them automatically sent to the publishing workflow. For example, a product owner can identify the webpage needing the product owner's attention in a timely and efficient manner.

The GUI 850 may include a delegated user component 852 that displays the available delegates able to act on behalf of the product owner. Specifically, the GUI 850 may display the web page ID 854, the approver ID 856, the delegate ID 858, the delegate name 860, and the delegate email address 862. In addition, the GUI 850 may include a text-based interface 864 to allow the product owner to search and assign new delegates by inputting the delegate's name in the text-based interface 866 and clicking the "search" button 866.

The GUI 850 may also include a component 868 that displays the available web pages/items to curate. Specifically, the component 868 may display detailed information for the web pages/items to be curated, including Action, ID, CCA, Batch, URL, Status, Action, Storefront, Product, Review Date, Modify Date, Updated Date, DID, and the like. In addition, the GUI may display the web pages/items differently based on different criteria. For example, the GUI may display the web pages in different colors or with other different indications based on the priority levels assigned to each webpage by the analytic server. In the example of GUI 850, the web pages/items are ranked according to priority levels, where the highest priority web pages/items are listed at the top, and where each priority level is indicated by a different color. In another example, the GUI 850 may display the web pages differently based on the status (e.g., active, expiring, expired, retired) of the web pages.

Figure 9A:
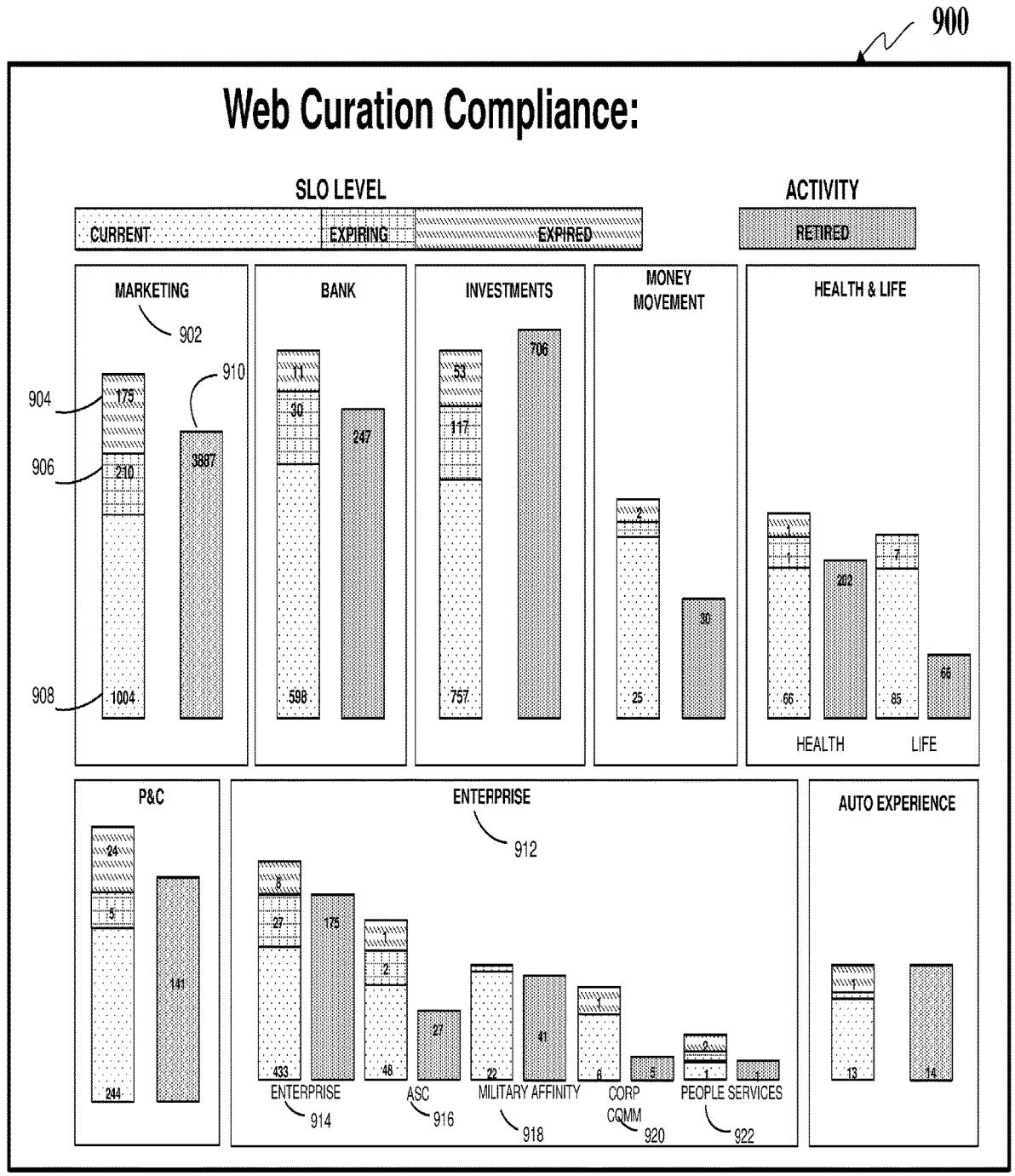
FIG. 9A illustrates an example of a graphical user interface of content curation dashboards, according to an embodiment.

FIG. 9A illustrates an example of a graphical user interface 900 of content curation dashboards, according to an embodiment. The GUI 900 may display the web curation compliance in different bundles/categories. For example, the web pages of a selected website may be categorized into multiple groups based on the services/products the web pages provide, such as marketing, bank, investments, money movement, health & life, P & C, enterprise, and auto experience. Within each group, the GUI may display the statistical data of the web curation. For example, in the group of marketing 902, there may be 1004 current web pages 908; 210 expiring web pages 906; 175 expired web pages 904; and 3887 retired web pages 910. The current web pages 908 may be a subset of web pages that satisfy the thresholds of the compliance rules. The expiring web pages 906 may be a subset of web pages that satisfy the thresholds but will no longer satisfy the thresholds after a predetermined period of time (e.g., expiring in 3 months). The expired web pages 904 may be a subset of web pages that do not satisfy the threshold and are still displayed within the website. The retired web pages 910 may be a subset of web pages that do not satisfy the thresholds and no longer displayed within the website. In some embodiments, a group may comprise multiple subgroups. For example, the group of enterprise 912 may comprise the subgroups of enterprise 914, ASC 916, military affinity 918, corp. comm. 920, people service 922. Within each subgroup, the GUI may display the statistical data of the web curation. The Using the illustrated dashboard 900, an administrator can easily identify a category of webpages that require immediate attention in a timely manner. The user can also interact with each group and the analytic server may dynamically reconfigure the dashboard 900 to display more detailed information, such as described in FIG. 10.

In some configurations, the analytic server may monitor a status of the webpages identified in GUI 900 and may update the GUI 900 in real time. For instance, when a bundle of webpages is determined as not satisfying one or more compliance rules, the analytic server may display an indication representing the bundle in GUI 900. As discussed above, the analytic server may also transmit electronic notifications to one or more computing systems generating the websites not satisfying the compliance rules (e.g., point of contact). When the point of contact update one or more websites within the bundle, the analytic server may update the indication representing the bundle accordingly. Therefore, the GUI 900, 950 (and similarly GUI 1000) are dynamically updated in real time based on the website.

Figure 9B:
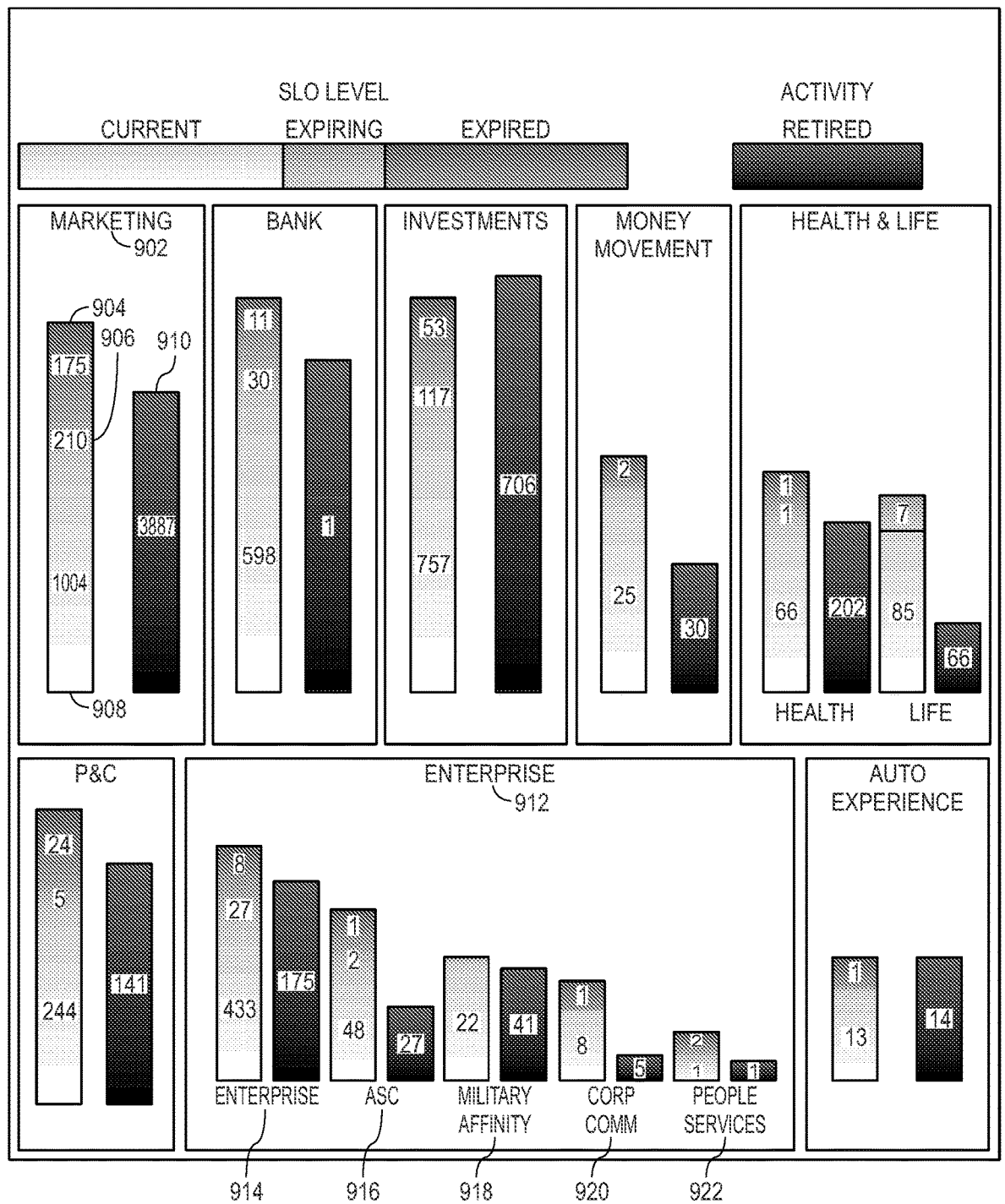
FIG. 9B illustrates an example of a graphical user interface of content curation dashboards in a heat map, according to an embodiment.

FIG. 9B illustrates an example of a graphical user interface 950 of content curation dashboards in a heat map, according to an embodiment. A heat map (or heatmap) is a graphical representation of data where the individual values are represented as colors where deviations and data changes are illustrated as gradual color changes.

Figure 10:
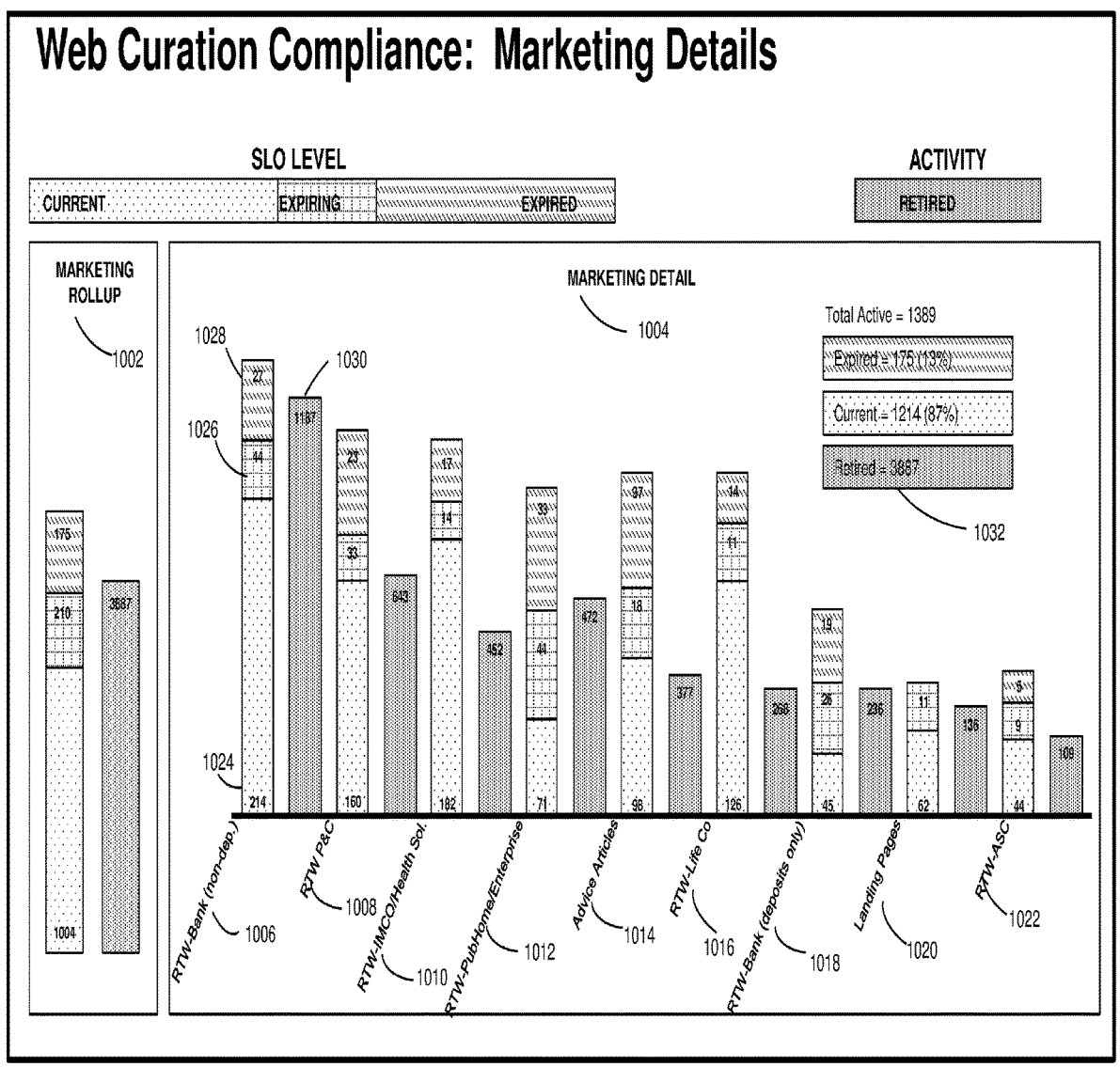
FIG. 10 illustrates an example of a graphical user interface of content curation for a particular category, according to an embodiment.

FIG. 10 illustrates an example of a graphical user interface 1000 of content curation for a particular category, according to an embodiment. The GUI may include the overall statistical data and more detailed data. For example, the GUI for marketing category 1000 may include the overall statistical data marketing rollup 1002 and marketing detail 1004. More specifically, the marketing rollup may be the overall statistical data of the marketing category as discussed in FIG. 9. That is there may be 1004 current web pages; 210 expiring web pages; 175 expired web pages; and 3887 retired web pages. The marketing detail 1004 may divide the marketing category into multiple subcategories and display the statistical data within each subcategory. For example, the marketing category may comprise the subcategories of RTW-BANK 1006, RTW P&C 1008, RTW-IMCO/Health Sol. 1010, RTW-PubHome/Enterprise 1012, Advice Articles 1014, RTW-Life Co 1016, RTW-Bank (deposits-only) 1018, Landing Pages 1020, RTW-ASC 1022. Within the subcategory of RTW-BANK 1006, there may be 214 current web pages 1024, 44 expiring web pages 1026, 27 expired web pages 1028, and 1187 retired web pages 1030. In addition, the GUI may include a graphical element 1032 to display statistical data on the number of total active web pages, the number of expired web pages, the number of current web pages, the number of retired web pages, the percentage of expired web pages, and the percentage of current web pages. Similarly, the analytic server may generate GUIs of content curation for other categories.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor executable software module, which may reside on a computer-readable or processor-readable storage medium. Non-transitory computer-readable or processor-readable media includes both computer storage media and tangible storage media that facilitate transfer of a computer program from one place to another. Non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A system comprising:
a webserver configured to publish a website comprising a set of web pages on a computing device; and
an analysis server communicatively coupled to the webserver, the analysis server comprising processing circuitry configured to:
determine whether each web page of the set of web pages satisfies a threshold based on a number of views associated with each web page;
determine a subset of web pages of the set of web pages that does not satisfy the threshold based on the number of views associated with each web page;
display, on the computing device, a graphical representation indicating the determined subset of web pages of the set of web pages that does not satisfy the threshold based on the number of views associated with each web page; and
in response to a selection of the graphical representation, display an additional graphical representation of statistical data associated with the determined subset of web pages, wherein the statistical data associated with the determined subset of web pages comprises a number of total web pages expiring after a predetermined time period, a percentage of web pages expiring after a predetermined time period, or both.

2. The system of claim 1, wherein the processing circuitry is configured to:
identify one or more points of contact associated with the determined subset of web pages, wherein the one or more points of contact comprise a content approver, a product owner, a stakeholder, or any combination thereof;
determine a priority level of each web page of the determined subset of web pages; and
transmit one or more notifications regarding the determined subset of web pages to one or more additional computing devices associated with the one or more points of contact based on the priority level.

3. The system of claim 2, wherein the one or more notifications indicate that the subset of web pages does not satisfy the threshold.

4. The system of claim 1, wherein the processing circuitry is configured to display, on the computing device, a second graphical representation indicating a second subset of web pages that satisfies the threshold based on the number of views associated with each web page.

5. The system of claim 1, wherein the processing circuitry is configured to: receive, from the computing device, an identifier associated with the set of web pages;
receive, from the webserver, markup language of each web page of the set of web pages based on the identifier; and parse the markup language of each web page to extract displayable content and a views metric indicating a number of views per unit of time associated with each web page.

6. The system of claim 5, wherein the threshold comprises a predetermined number of views per unit of time stored in a database or a number of views per unit of time set by a user of the computing device.

7. A computer-implemented method comprising:
determining, via processing circuitry of a computing device, whether each web page of a set of web pages satisfies a threshold based on a number of views associated with each web page;
determining, via the processing circuitry, a subset of web pages of the set of web pages that does not satisfy the threshold based on the number of views associated with each web page;
displaying, on an electronic display of the computing device, a graphical representation indicating the determined subset of web pages of the set of web pages that does not satisfy the threshold based on the number of views associated with each web page; and
in response to a selection of the graphical representation, display an additional graphical representation of statistical data associated with the determined subset of web pages, wherein the statistical data associated with the determined subset of web pages comprises a number of total web pages expiring after a predetermined time period, a percentage of web pages expiring after a predetermined time period, or both.

8. The method of claim 7, comprising:
identifying, via the processing circuitry, one or more points of contact associated with the subset of web pages; and
transmitting electronic messages to one or more additional computing devices associated with the one or more points of contact indicating that the determined subset of web pages does not satisfy the threshold.

9. The method of claim 8, wherein the electronic messages comprise one or more analysis reports of the determined subset of web pages, wherein each analysis report of the one or more analysis reports comprises the graphical representation corresponding to the determined subset of web pages.

10. The method of claim 7, wherein the number of views is associated with viewings of each web page of the set of web pages by different users over a predetermined period of time.

11. The method of claim 7, comprising:
receiving, from the computing device, an identifier associated with the set of web pages of a website;
receiving, from a webserver associated with the website, markup language of each web page of the set of web pages based on the identifier; and
parsing, by the processing circuitry, the markup language of each web page to extract displayable content and a views metric indicating a number of views per unit of time associated with each web page.

12. The method of claim 7, comprising:
determining, via the processing circuitry, an additional subset of web pages of the set of web pages that satisfies the threshold based on the number of views associated with each web page; and
displaying, on the electronic display of the computing device, a respective graphical representation indicating the additional subset of web pages of the set of web pages that satisfies the threshold based on the number of views associated with each web page.

13. A tangible, non-transitory, computer-readable medium, comprising instructions for managing a website that, when executed by one or more processors, cause the one or more processors to:
determine whether each web page of a set of webpages associated with the website satisfies a threshold based on a number of views associated with each web page;
determine a subset of web pages of the set of web pages that does not satisfy the threshold based on the number of views associated with each web page;
display, on a computing device, a graphical representation indicating the determined subset of web pages of the set of web pages that does not satisfy the threshold based on the number of views associated with each web page; and
in response to a selection of the graphical representation, display an additional graphical representation of statistical data associated with the determined subset of web pages, wherein the statistical data associated with the determined subset of web pages comprises a number of total web pages expiring after a predetermined time period, a percentage of web pages expiring after a predetermined time period, or both.

14. The tangible, non-transitory, computer-readable medium of claim 13, wherein the instructions, when executed by the one or more processors, cause the one or more processors to:
receive, from the computing device, an identifier associated with the set of web pages of the website;
receive markup language of each web page of the set of web pages based on the identifier; and
parse the markup language of each web page to extract displayable content and a views metric indicating a number of views per unit of time associated with each web page.

15. The tangible, non-transitory, computer-readable medium of claim 13, wherein the instructions, when executed by the one or more processors, cause the one or more processors to identify one or more points of contact associated with the determined subset of web pages, wherein the one or more points of contact comprise a content approver, a product owner, a stakeholder, or any combination thereof.

16. The tangible, non-transitory, computer-readable medium of claim 15, wherein the instructions, when executed by the one or more processors, cause the one or more processors to:
generate an analysis report comprising the graphical representation and the additional graphical representation; and
transmit the analysis report to one or more additional computing devices associated with the one or more points of contact.

17. The tangible, non-transitory, computer-readable medium of claim 13, wherein the threshold comprises a predetermined number of views per unit of time stored in a database or a number of views per unit of time set by a user of the computing device.

18. The tangible, non-transitory, computer-readable medium of claim 13, wherein the number of views comprises viewings of each web page of the set of web pages by different users over a period of time.

19. The tangible, non-transitory, computer-readable medium of claim 13, wherein the instructions, when executed by the one or more processors, cause the one or more processors to:
  determine an additional subset of web pages of the set of web pages that satisfies the threshold based on the number of views associated with each web page; and
  cause display, on the computing device, a respective graphical representation indicating the additional subset of web pages of the set of web pages that satisfies the threshold based on the number of views associated with each web page.

\* \* \* \* \*